United States Patent [19]

Matsumoto et al.

[11] Patent Number: 4,845,709
[45] Date of Patent: Jul. 4, 1989

[54] DATA TRANSFER CONTROL SYSTEM

[75] Inventors: Masahiro Matsumoto; Akira Watanabe; Kazuo Ohhashi; Minoru Itao, all of Kamakura, Japan

[73] Assignee: Mitsubishi Denki K.K., Tokyo, Japan

[21] Appl. No.: 49,702

[22] Filed: May 13, 1987

[30] Foreign Application Priority Data

| May 14, 1986 | [JP] | Japan | 61-110201 |
| Jun. 27, 1986 | [JP] | Japan | 61-151189 |
| Feb. 3, 1987 | [JP] | Japan | 61-23193 |
| Feb. 3, 1987 | [JP] | Japan | 61-23194 |

[51] Int. Cl.⁴ .............................................. H04J 3/02
[52] U.S. Cl. .................................. 370/86; 340/825.05
[58] Field of Search ........................... 370/86, 85, 94; 340/825.5, 825.51, 825.05

[56] References Cited

U.S. PATENT DOCUMENTS

| 4,525,832 | 6/1985 | Miyao | 370/85 |
| 4,528,661 | 7/1985 | Bahr et al. | 370/86 |
| 4,716,575 | 12/1987 | Douros et al. | 370/86 |

Primary Examiner—Robert L. Griffin
Assistant Examiner—Wellington Chin
Attorney, Agent, or Firm—Takeuchi Patent Office

[57] ABSTRACT

The data transmission control system includes a transmitter/receiver data buffer for temporarily storing data transmitted to or from a ring transmission line, a basic clock generating device for generating a basic clock and its phase data to be transmitted in a packet to the next node to synchronize a basic clock of the next node, and a controller for controlling data storage of the data buffer and timing of data transmission to the ring transmission line so as to produce a constant transmission time, thus making it possible to use a circuit switching method in the token ring network.

9 Claims, 14 Drawing Sheets

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 1 | 2 | 3 | 4 | 5 | 6 | 7 | 8 | 9 | A | B | C | D | E | F |
| 1 | 1 | 2 | 3 | 4 | 5 | 6 | 7 | 8 | 9 | A | B | C | D | E | F | 0 |
| 2 | 2 | 3 | 4 | 5 | 6 | 7 | 8 | 9 | A | B | C | D | E | F | 0 | 1 |
| 3 | 3 | 4 | 5 | 6 | 7 | 8 | 9 | A | B | C | D | E | F | 0 | 1 | 2 |
| 4 | 4 | 5 | 6 | 7 | 8 | 9 | A | B | C | D | E | F | 0 | 1 | 2 | 3 |
| 5 | 5 | 6 | 7 | 8 | 9 | A | B | C | D | E | F | 0 | 1 | 2 | 3 | 4 |
| 6 | 6 | 7 | 8 | 9 | A | B | C | D | E | F | 0 | 1 | 2 | 3 | 4 | 5 |
| 7 | 7 | 8 | 9 | A | B | C | D | E | F | 0 | 1 | 2 | 3 | 4 | 5 | 6 |
| 8 | 8 | 9 | A | B | C | D | E | F | 0 | 1 | 2 | 3 | 4 | 5 | 6 | 7 |
| 9 | 9 | A | B | C | D | E | F | 0 | 1 | 2 | 3 | 4 | 5 | 6 | 7 | 8 |
| A | A | B | C | D | E | F | 0 | 1 | 2 | 3 | 4 | 5 | 6 | 7 | 8 | 9 |
| B | B | C | D | E | F | 0 | 1 | 2 | 3 | 4 | 5 | 6 | 7 | 8 | 9 | A |
| C | C | D | E | F | 0 | 1 | 2 | 3 | 4 | 5 | 6 | 7 | 8 | 9 | A | B |
| D | D | E | F | 0 | 1 | 2 | 3 | 4 | 5 | 6 | 7 | 8 | 9 | A | B | C |
| E | E | F | 0 | 1 | 2 | 3 | 4 | 5 | 6 | 7 | 8 | 9 | A | B | C | D |
| F | F | 0 | 1 | 2 | 3 | 4 | 5 | 6 | 7 | 8 | 9 | A | B | C | D | E |

Rows: SLAVE PHASE DATA. Columns: MASTER PHASE DATA.

DATA TRANSFER CONTROL SYSTEM

BACKGROUND OF THE INVENTION

This invention relates to a data transmission control system which is able to perform a circuit switching function in a token ring type local area network.

Heretofore, local area networks have been able to use only a packet switching method and there are no local area networks making use of a circuit switching method. Since there is no prior art in this respect, a packet switching method for a token ring system will be outlined below.

Figure 19:
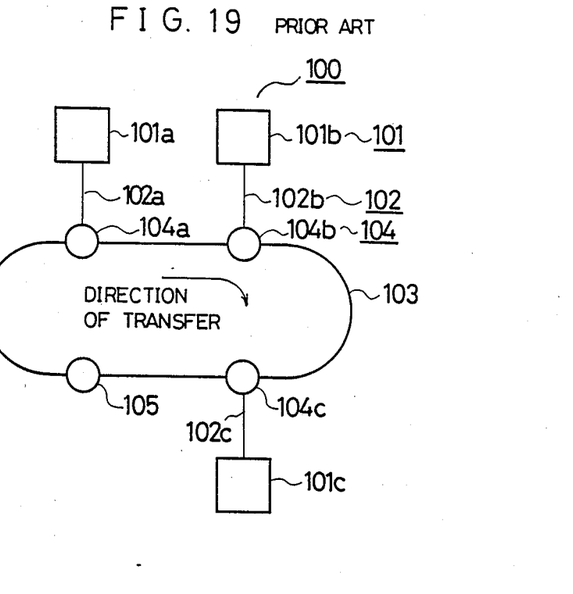
FIG. 19 is a schematic diagram of a token ring network according to the prior art.

FIG. 19 schematically shows a token ring network system, which includes terminals 101a through 101c, terminal interface lines 102a through 102c, a unidirectional ring transmission line 103, and nodes 14a through 104c each capable of reproducing and repeating signals on the ring transmission line 103 and permitting data transmission between the terminal 101 and the ring transmission line 103. The data transmission to the terminal 101 is effected via the terminal interface line 102. A ring transmission line controller 105 is provided for token control and generation of a system clock to synchronize the entire system. The central controller 105 may be replaced by a local controller installed in each node 101.

Figure 20:
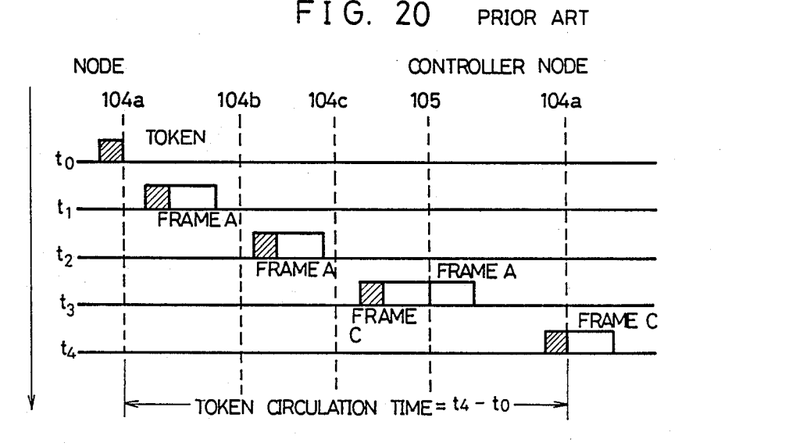
FIG. 20 shows the data transmission in the token ring network of FIG. 19.

FIG. 20 shows the data tranmission in the token ring network of FIG. 19. A token arrives at the node 104a at a time to. At this time, the node 104a has data to be transmitted and sends it out as a frame A to the ring transmission line 103 while reproducing the token immediately after the frame A at a time $t_1$. The node 104b has not data to be transmitted and merely reproduces and repeats the frame A and the token at a time $t_2$. If the frame A is addressed to the node 104b, the node 104b receives the frame A while performing the reproduction and repeating. At a time $t_3$, the node 103c transmits a frame C and reproduces the token, while the frame A is reproduced and repeated by the controller 105. At a time $t_4$, the node 104a discards the frame A which has completed a cycle of excursion through the ring transmission line 103, and receives the token again. In this example, the token excursion time at the node 104a is $t_4 - t_0$).

In this token ring network, the token excursion time is the sum of the propagation time through the ring transmission line 103 including the reproduction and repeating time at each node and the time length of a frame transmitted including the time length of a token. Consequently, it varies widely depending on the size of a system and the transmission status of each node. Because of this variation, the token ring system networks, which have been able to use a packet switching method, have been unable to employ a circuit switching method.

In order to use a circuit switching method, it is necessary to maintain a constant speed or rate of data transmission between terminals. The variation in the token excursion time, however, presents the following problems. If the data transmission rate between terminals is X bits/sec (constant) and the token Excursion time is t sec (variable), then the transmnitter data buffer stores X·t bits of new data and transmits them to the receiver data buffer via the ring transmission line 3. The data received by the receiving buffer is transmitted to the receiving terminal at the constant rate of X bits/sec so that X·t bits of data are transmitted to the receiving terminal in t seconds. Consequently, if the next data does not arrive at the receiving buffer in t seconds, an underlfow condition takes place in the receiving buffer, resulting in a temporary interruption of data transmission to the terminal. In the token ring system, the token excursion time always varies, and such an underflow condition frequently occurs unless some countermeasure is taken. Otherwise, it is impossible to implement a circuit switching method in a token ring network.

SUMMARY OF THE INVENTION

Accordingly, it is an object of the invention to provide a token ring network system with a circuit switching function by eliminating the data buffer under flow due to the token excursion variation in the token ring network.

According to one aspect of the invention there is provided a token ring network with a synchronization unit which establishes synchronization between the particular nodes in the network independently of both the synchronization of the network as a whole and the communication speed or rate of the network. The synchronization between the nodes is established by mutually transmitting clock phase data in packets.

According to another aspect of the invention, a predetermined amount of data is stored in a data buffer under the control of a controller, and data transmission from the data buffer is started a predetermined period of time after setting-up of a data transmission mode. Thus, no underlfow condition takes place in the receiving data buffer.

Other objects, features, and advantages of the invention will be apparent from the following description taken in conjunction with the accompanying drawings.

BRIEF DESCRIPTION OF THE DRAWINGS

FIG. 13 is a timing chart showing the operation of the variable frequency divider of FIG. 12 when a salve phase delay is compensated for;

DESCRIPTION OF THE PREFERRED EMBODIMENT

Prior to the description of embodiments of the invention, a system for implementing a circuit switching method in a token ring network by preventing the occurrence of an underflow condition when synchronization is present will be described, and then a synchronization unit for implementing the synchronization will be described.

Figure 1:
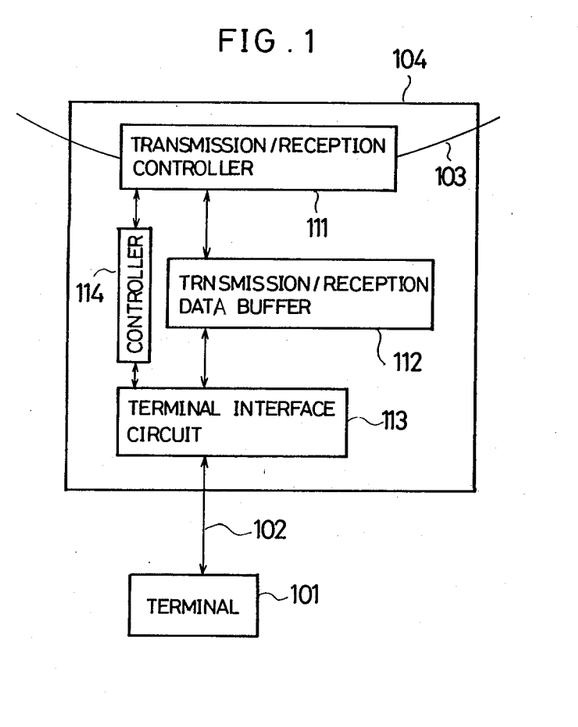
FIG. 1 is a block diagram of a node in a token ring network according to an embodiment of the invention.

In FIG. 1 there is shown a node 104 which includes a ring transmission/reception controller 111 provided on a ring transmission line 103 for controlling transmission, reception, reproducing, and repeating of transmission data, a transmission/reception data buffer 112 for temporarily storing transmission data, a terminal interface circuit 113 for a terminal 101, and a general controller 114 for controlling the respective devices 111 through 113. In this embodiment, the terminal 101 is an exclusive transmission terminal connected to the terminal interface 113 via a terminal interface line 102. The present invention concerns a data transmission control system which is mounted in the general controller 114.

Figure 2:
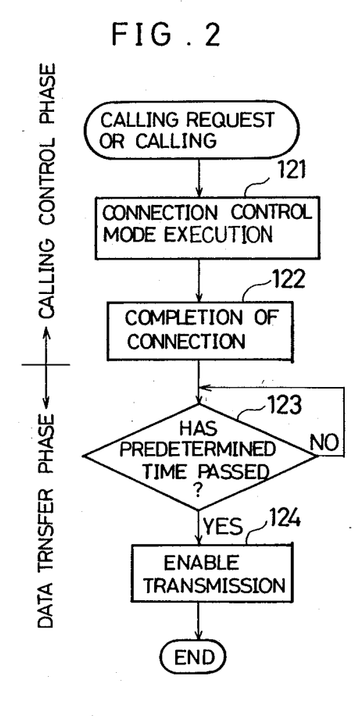
FIG. 2 is a flowchart showing the control function of a controller useful in the network of FIG. 1.

FIG. 2 shows an initial operation of the controller 114 until it is ready to start transmission of data from the terminal 101 to the ring transmission line 103 in response to a calling request by the terminal 101 or a calling reception from another node. As soon as a data transmission mode is set up upon completion of a calling control mode in steps 121 and 122, transmission data from the terminal 101 is fed to the data buffer 112. However, transmission of the data to the ring transmission line 103 in a step 124 is enabled only when the passage of a predetermined period of time is found in a step 123.

If the predetermined period is $t_w$ and the operational speed of the terminal interface is X bits/sec, then the amount of data sent out to the ring transmission line 103 is $X \cdot t_w$ bits. The data stored in the data buffer 112 is sent out to the ring transmission line 103 whenever a token arrives. The amount of data stored in the data buffer 112 increases with the time. Thus, the decision of the step 123 may be made by finding when the data stored in the data buffer 112 has reached the predetermined amount of data or $X \cdot t_w$ bits. The storage capacity of the data buffer 112 is made greater than $X \cdot t_w$ bits.

Figure 3:
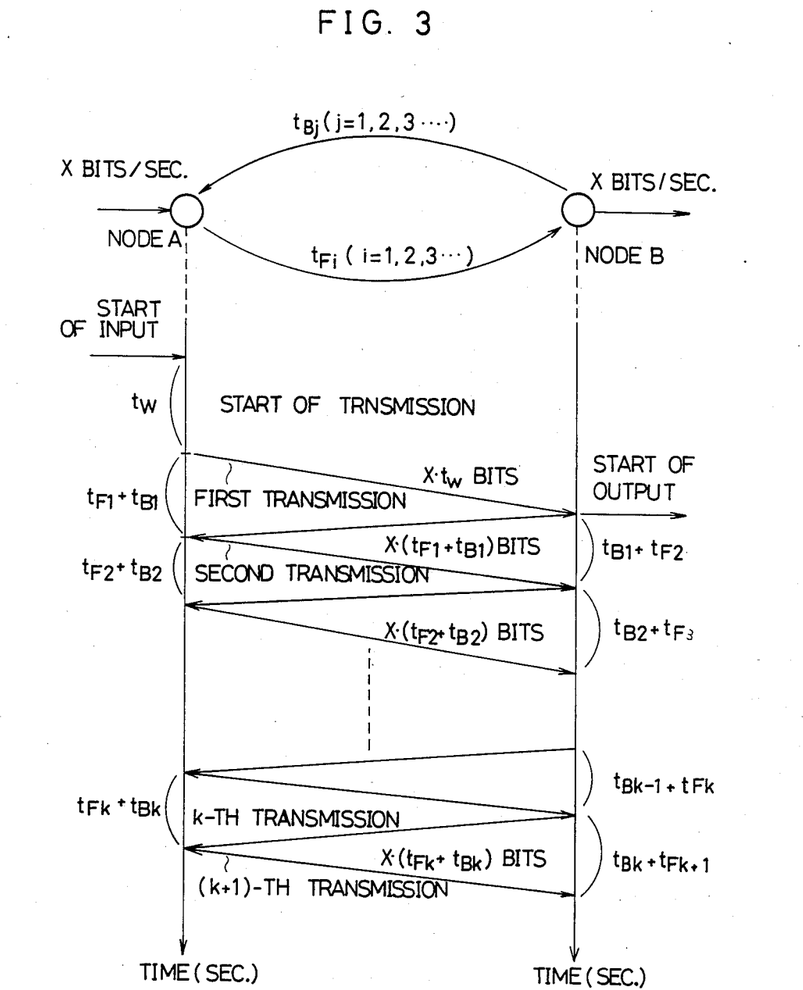
FIG. 3 shows a data transmission sequence in the network of FIG. 1.

The method of calculation of the predetermined period of time $t_w$ will be described below. FIG. 3 shows a method of data transmission from the node A to the node B. Data flows into the node A from the terminal 101a at a rate of X bits/sec and flows out from the node B to the terminal 101b at the sme rate of X bits/sec. The forward transmission time from the node A to the node B is represented by $t_{Fi}$ (i=1, 2, 3, ...), and the backward transmission time from the node B to the node A is represented by $t_{Bj}$ (j=1, 2, 3, ...), wherein i and j are token excursion numbers on the ring transmission line 103.

If the data is transmitted to the ring transmission line 103 $t_w$ seconds after it flows out of the terminal 101a, $X \cdot t_w$ bits of data are to be transmitted to the node B. Upon reception of the data, the node B transmits it to the terminal 101b at the rate of X bits/sec. Subsequently, the node A continues transmission to the ring transmission line 103 while picking up a token for each excursion. The amount of data remained in the receiver data buffer immediately before the node B received new data from the transmission line 103 in the n-th excursion is $$X \cdot (t_w - t_{B1} - t_{F2} + t_{F1} + t_{B2} - t_{F3} \ldots - t_{Bn} - 2 - t_{Fn} - 1 + t_{Fn} - 2 + t_{Bn} - 2 - t_B - 1 - t_{Fn}) \text{ bits.}$$

When rearranged, it becomes
If this value is negative, there is an underflow condition in the data buffer. This underflow condition may be eliminated by satisfying the following condition $$X \cdot (t_w + t_{Fl} - t_{Fn} - l - t_{bn} - l - t_{Fn} > 0$$

or $$t_w > (t_{Fn} - l + t_{Bn} - 1) + (t_{Fn} - t_{Fl}).$$

The maximum values of $(t_{Fn-1} + t_{Bn-1})$ and $(t_{Fn} - t_{F1})$ are $(t_F\max + t_B\max)$ and $(t_F\max - t_F\min)$, respectively. The former value corresponds to the maximum token excursion time while the latter value to the maximum forward transmission time between two nodes. However, there is a case where the next node is located in a direction opposite to the direction of data transmission. Hence, it will be seen that even in the worst case, it is sufficient to set the predetermined delay time $t_w$ to be a time period twice as long as the maximum token excursion time.

Figure 4:
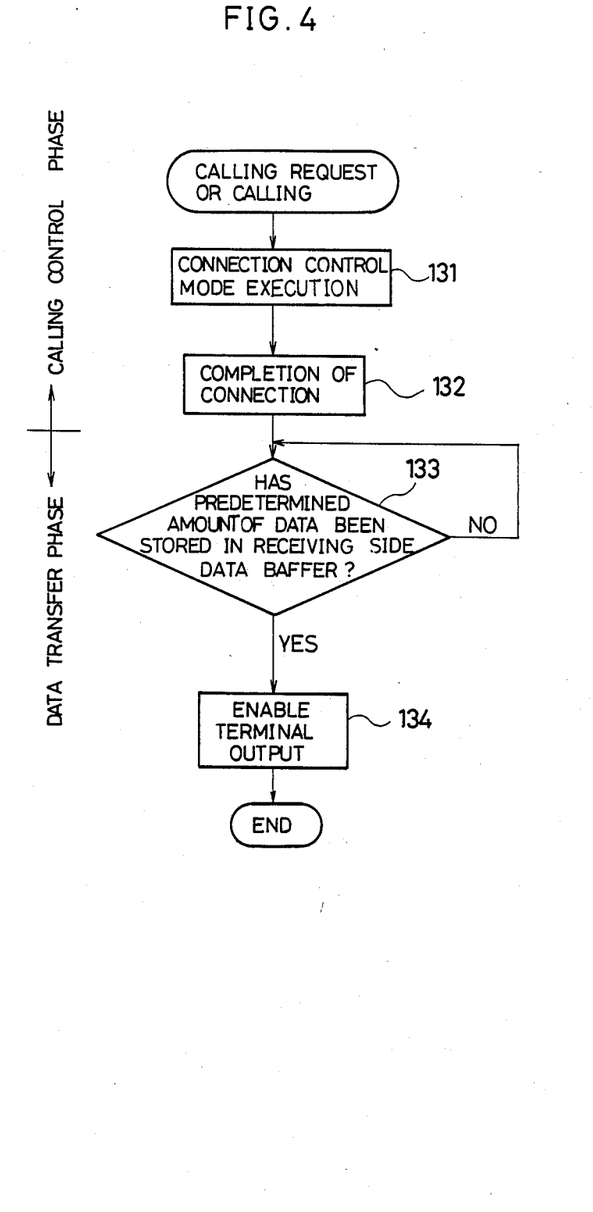
FIG. 4 is a flowchart showing the control function of a controller according to another embodiment of the invention.

Although the above description has been made on the transmitter data buffer, it is possible to apply to the receiver data buffer as shown in FIG. 4. The same results may be obtained by providing the predetermined delay time $t_w$ for both transmitter data buffers according to the flow charts of FIGS. 2 and 4, respectively.

Figure 5:
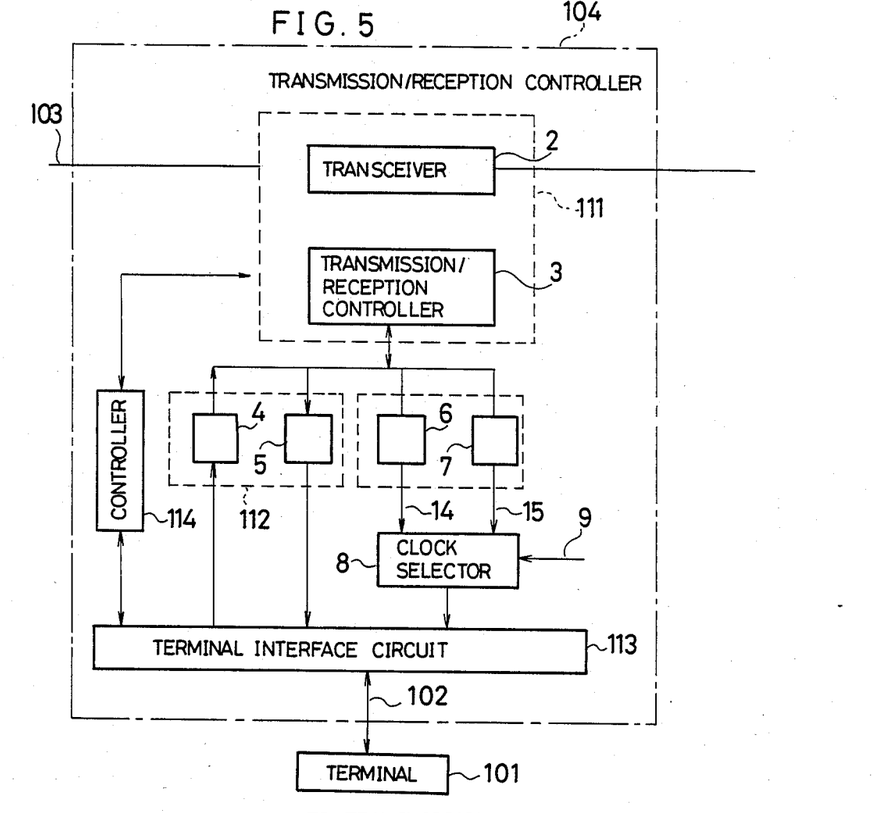
FIG. 5 is a block diagram in more detail of the node of FIG. 1.

A synchronization unit according to the invention will now be described with reference to FIG. 5, wherein a node 104 is connected to a transmission line 103 via a transceiver 2. A transmission/reception controller 3 controls access to the medium in the network system, and transmission and reception of data including basic clock phase data which will be described later. A transmitter data buffer 4 temporarily stored transmission data from the terminal 101, which is connected to the node 104 via the interface line 102. The data stored in the data buffer 4 is sent out as a burst to the transmission line 103 when the node 104 picks up a token for the right of transmission. A receiver data buffer 5 receives data from the transmission line 103 and stores the data addressed to the terminal 101 and continuously sends out the stored data to the terminal 101. The speed of communication on the transmission line 103 is made higher than the communication speed of the terminal 101, and a continuous data stream on the terminal interface line 102 is made to correspond to an intermittent data stream in a time-compressed form on the transmission line 103.

A basic clock generator 6 and a basic clock reproduction circuit 7 are used to make a synchronization unit according to the invention. The basic clock generator 6 is used when the node 1045 is a clock master, while the basic clock reproduction circuit 7 is used when the node 104 is a clock slave. A clock selector 8 supplies the terminal 101 with either a master clock 14 of the basic clock generator 6 or a slave clock 15 of the basic clock reproduction circuit 7 depending on a selector control signal 9 set by the operator. It is possible to supply both the master and the slave clocks 14 and 15 to the terminal 101 for respective transmission and receiving functions of the terminal 101. The clock selecting function, however, is irrelevant to the subject matter of this application and will not be described in detail. A terminal interface circuit 113 interfaces the transmitter and receiver data buffers 4 and 5, and the clock selector 8 to the terminal 101. A terminal interface line 102 connecting the terminal 101 to the interface circuit 113 may be a standard interface such as RS232C.

Figure 6:
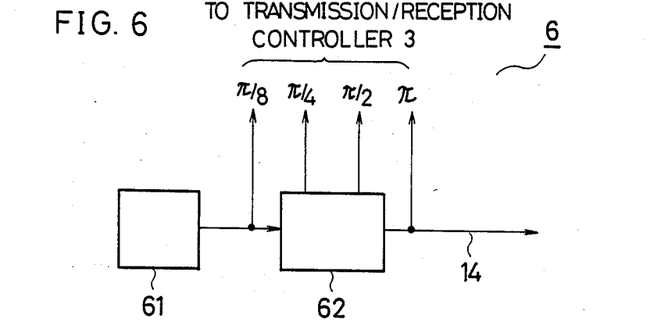
FIG. 6 is a block diagram of a basic clock generator useful for the network of FIG. 1.

FIG. 6 shows the basic clock generator 6 according to an embodiment of the invention. A frequency divider 62 divides a frequency of oscillation generated by an oscillator 61 to produce intermediate frequencies. This frequency divider 62 is a one-eighth frequency divider. Its last stage outputs a master clock 24 which is supplied to the terminal 101. Four bit data on the individual frequency division stages $\pi/8$, $\pi/4$, $\pi/2$, and $\pi$ is supplied as phase data of the master clock 14 to the transmission/reception controller 3. That is, the frequency divider 62 generates both the master clock 14 and its digital phase data in a single circuit.

Figure 7:
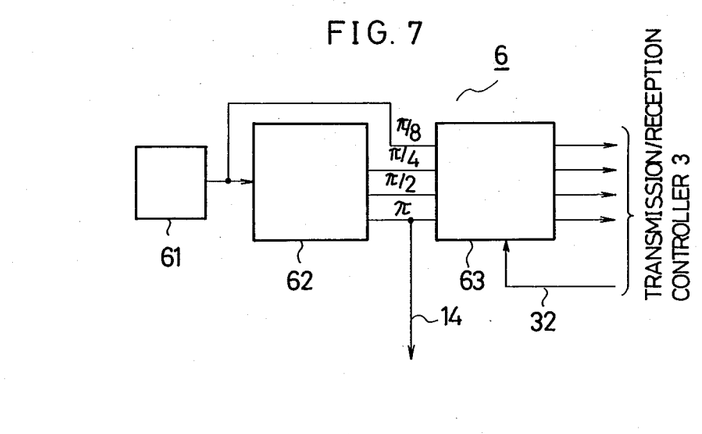
FIG. 7 is a block diagram of a basic clock generator according to another embodiment of the invention.

FIG. 7 shows the basic clock generator 6 in more detail, wherein a master-side master phase register 63 holds digital phase data from the frequency divider 62. The frequency divider 62 is a on-eighth frequency divider. Its last stage outputs a master clock 14 which is supplied to the terminal 101, while its respective frequency division stages supply digital phase data $\pi/8$, $\pi/4$, $\pi/2$, and $\pi$ of the master clock 14 to the master phase register 63.

Whenever a phase data packet is transmitted to the network, the contents of the master phase register 63 are updated in response to a phase data transmission start pulse 32 from the transmission/reception controller 3. The updated contents of the master phase register 63 (the digital phase data of the master clock 14 when the packet transmission is started) are transmitted to the network as the contents of the packet. The frequency divider 62 generates both the master clock 14 and its digital phase data in a single circuit.

Figure 8:
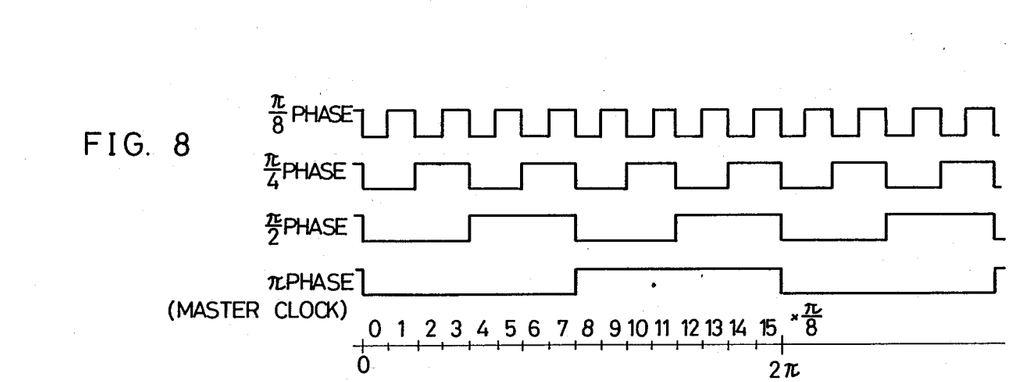
FIG. 8 is a timing chart showing the generation of a basic clock, the operation of a frequency divider in a basic clock reproduction circuit and phase quantization.

FIG. 8 is shows the input and outputs of the frequency divider 62 indicating that the phase of a cycle ($2\pi$) of the master clock 14 is digitalized in $\pi/8$ steps (4 bits). As phase data of the master clock 14, the master node transmits the newest digital phase data; namely, the digital phase data at the time of start of transmission.

Figure 9:
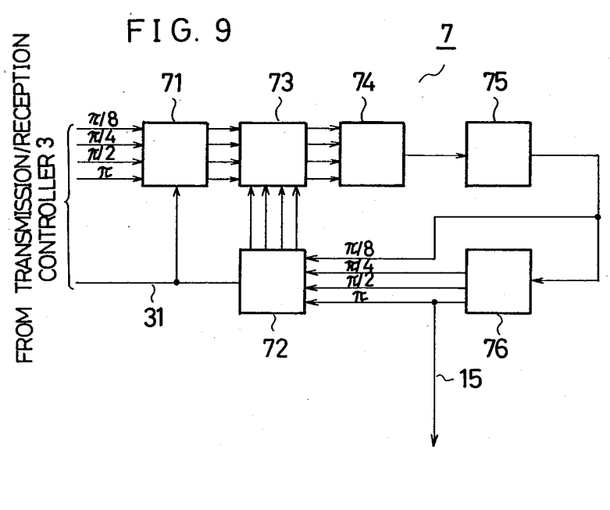
FIG. 9 is a block diagram of the basic clock reproduction circuit of FIG. 8.

FIG. 9 shows the basic clock reproduction circuit 7 which includes a 4-bit master phase register 71 for holding the digital phase data transmitted from the master node via the transmission/reception conroller 3 and a slave phase register 72 for holding the digital phase data of the slave clock 15. The contents of the resisters 71 and 72 are updated in response to a phase data reception pulse 31 which is supplied by the transmission/reception controller 3 upon reception of the master phase data. A subtractor 73 provides a phase difference between the contents of the registers 71 and 72. The digital phase difference is converted into an analog voltage in a digital-to-analog converter 74. The analog voltage is applied to a voltagecontrolled oscillator (VCO) 75 to control the frequency of the oscillator 75. The output of the VCO 75 is applied to a frequency divider 76 which is similar to that of FIG. 7. The frequency divider 76 generates a slave clock 15 which is applied to the terminal 101 and digital phase data of the slave clock 15 which is applied to the slave phase register 72. The basic clock reproduction circuit 7 is basically the same as the prior art PLL (phase-locked loop) except that the phase data is sampled and compared so that the slave phase may be locked to the master phase based on the sampling theory as far as variations in the phase difference are within the limits for the sampling period.

Figure 10:
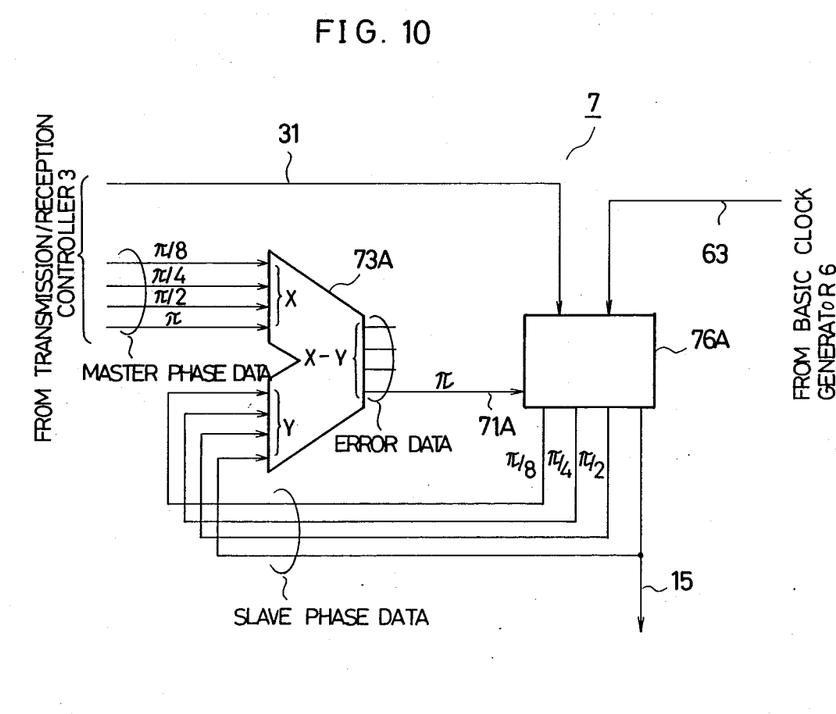
FIG. 10 is a block diagram of a basic clock generator according to another embodiment of the invention.

FIG. 10 shows the basic clock reproduction circuit 7 according to another embodiment of the invention. A variable frequency divider 76A divides the frequency of a reproduction clock at a predetermined ratio to provide the slave clock 15 and its slave phase data. A subtractor 73A subtracts the slave phase data from the master phase data transmitted from the master node via the transmission/reception controller 3 to provide a difference between the master and slave phase data and applied to the frequency divider 76A part or all of the error data as phase control data 71A.

Whenever the master phase data is received, a phase data reception pulse 31 is applied to the variable frequency divider 76A to hold the value of the phase control data 71A at the time. The variable frequency divider 76A adjusts the slave phase according to the held value to keep constant the error between the master and slave phases. More specifically, if the slave phase is lagging behind the master phase, the phase control data 71A has a positive value. In this case, the variable frequency divider 76A reduces the frequency division ratio to advance the slave phase. If the slave phase is leading the master phase, the phase control data 71A is negative. Thus, the variable frequency divider 76A increases the frequency division ratio to slow the slave phase.

Figure 11:
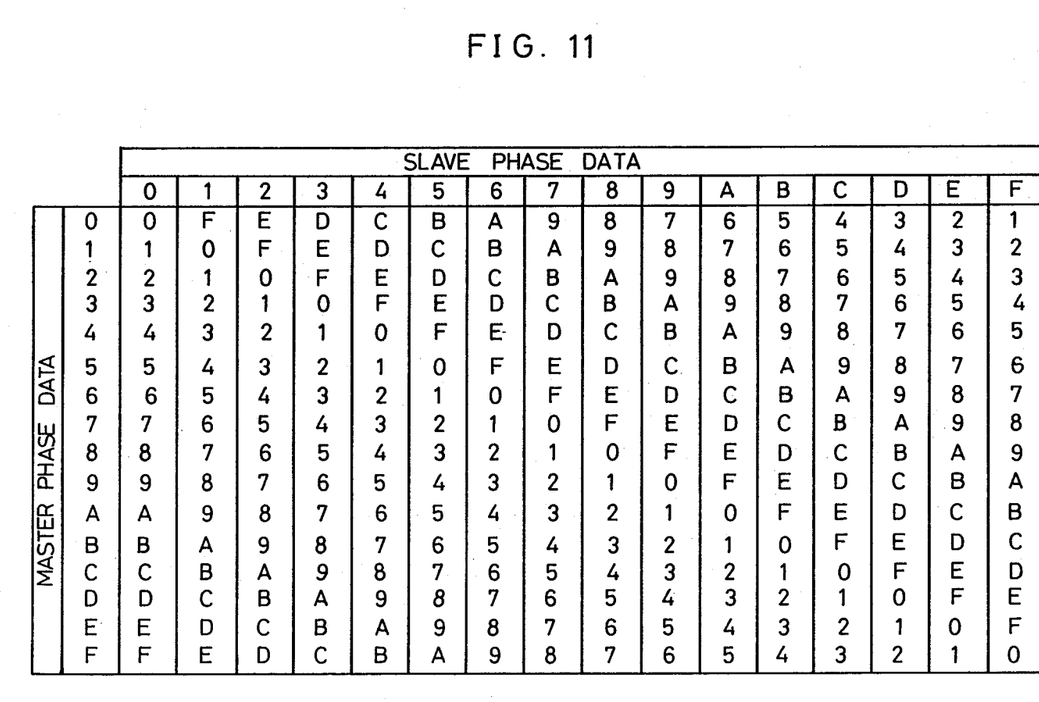
FIG. 11 is a table listing error data obtained from the subtractor of FIG. 10.

FIG. 11 lists errors in the 4-bit phase data expressed in hexadecimal numbers. it will be seen from the table that the slave phase is in step with or lagging behind the master phase when the error data is between 0 and 7 (i.e., positive) and ahead of the master phase when the error data is between 8 and F (i.e., negative). Hence, it is possible to control the variable frequency divider 76 with the use of only the sign bit (i.e., $\pi$ phase data) of the error data. In the embodiment of FIG. 10, the phase $\pi$ of the error data is used as the phase control data 71A.

Figure 12:
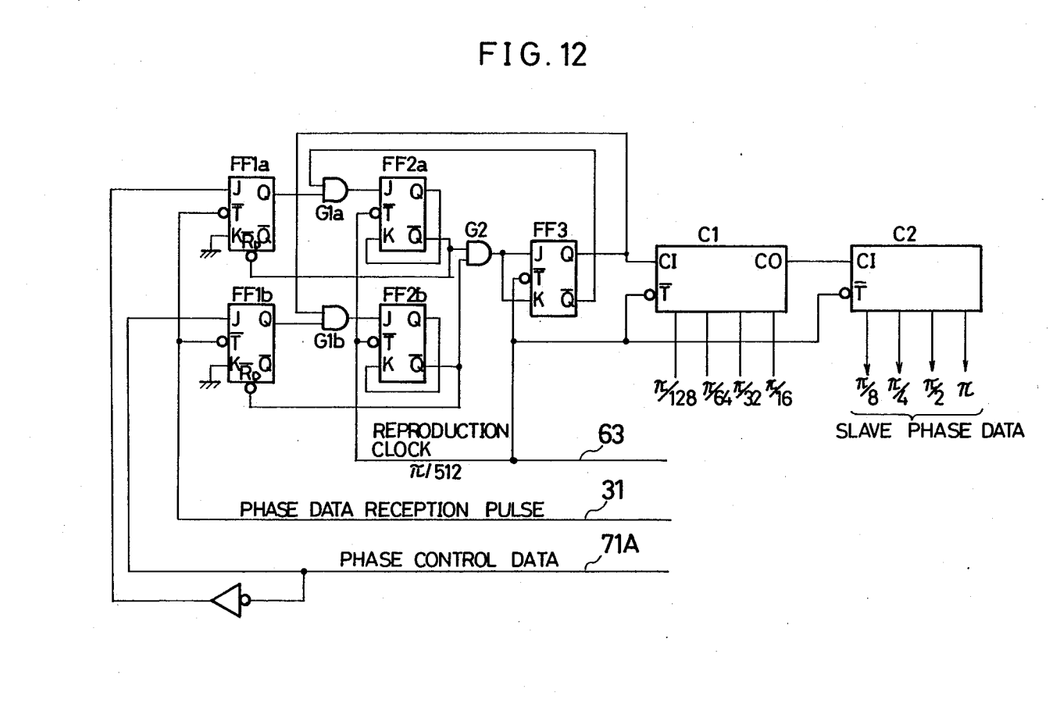
FIG. 12 is a schematic diagram of the variable frequency divider shown in FIG. 10.

FIG. 12 shows the variable frequency divider 76A, the configuration whereof is well known. If the output of an AND gate G2 is "H" at all times, a J-K flip-flop FF3 merely divides the frequency of the reproduction clock 63 into one half and constitutes a 1/512 frequency divider with synchronous 4-bit counters C1 and C2 on the subsequent stage.

Figure 13:
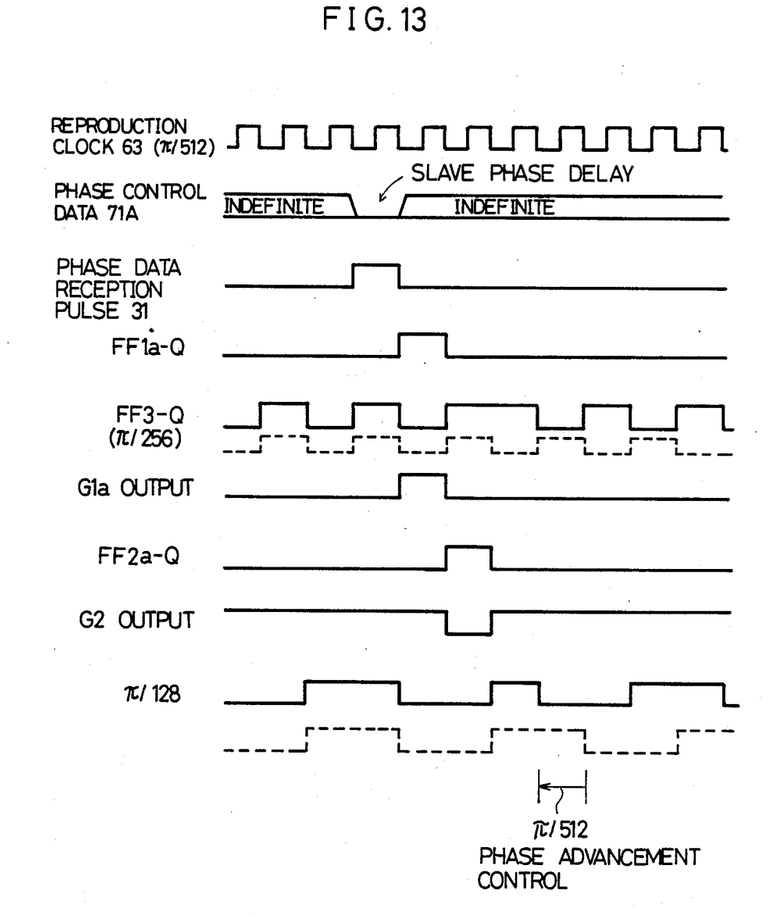

FIG. 13 shows the operation of the variable frequency divider 76A when a delay of the slave phase is compensated for. When the slave phase is lagging behind the master phase, the phase control data 71A is "L" and a flip-flop FF1A is set with the trailing end of the phase data reception pulse 31. When the output Q of the flip-flop FF1a goes to "H" and the output Q of a flip-flop FF3 becomes "L", the output of an AND gate G1a becomes "H". When a pulse of the reproduction clock 63 is generated under this condition, the output Q of the flip-flop FF3 becomes "H" with the trailing end of the clock pulse. At the same time, the output Q of the flip-flop FF2a goes to H and the flip-flop FF1a is reset. When the flip-flop FF2a is set, the output of an AND gate G2 becomes "L". Consequently, the flip-flop FF3 remains in the same state to hold Q="H" when the next clock pulse is generated. Thus, a carry input (CI) is applied to the next stage synchronous 4-bit counter C1 for two successive clock pulses to effect phase advancement by $\pi/512$.

When the variable frequency division control is not provided, the operation of the flip-flop FF3 and the output of the counter C1 in terms of $\pi/128$ are shown by dashed lines.

Figure 14:
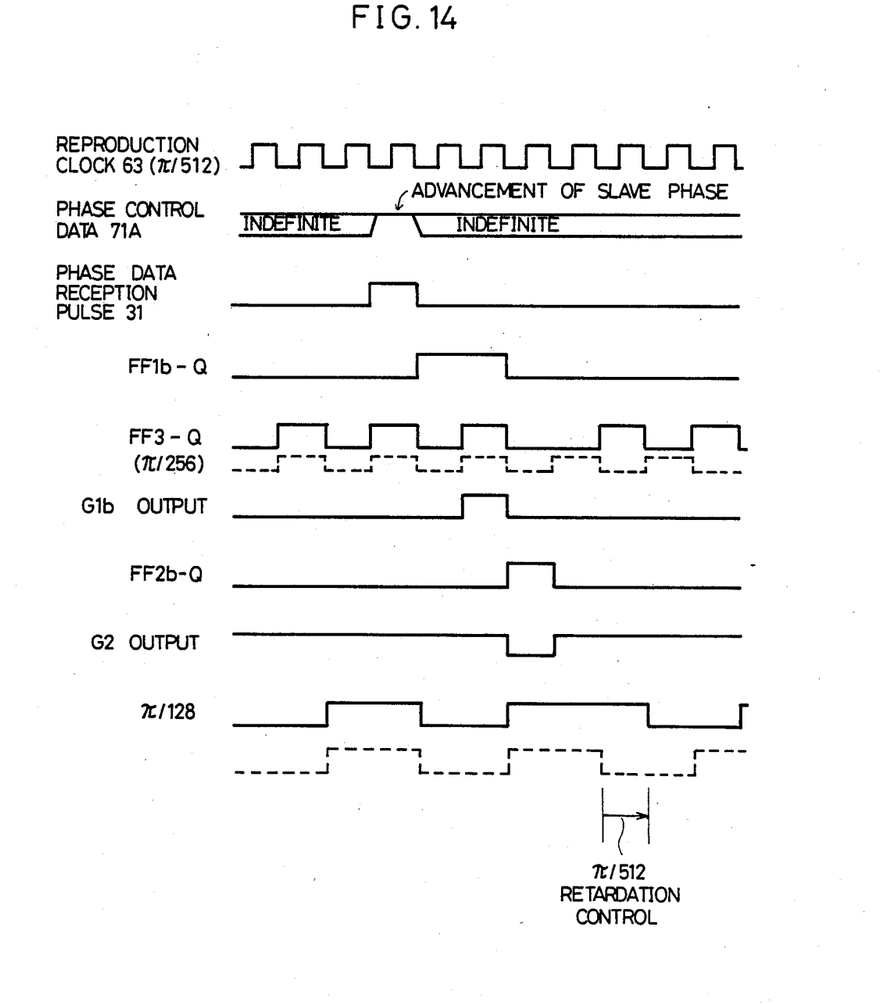
FIG. 14 is a timing chart showing the operation of the variable frequency divider when a slave phase is leading the master phase.

FIG. 14 shows the operation of the variable frequency divider 76A when the slave phase is ahead of the master phase. This operation is easy to understand from the above description and will not be described in detail. Through the above variable frequency division control, the slave phase is controlled so as to follow the master phase which is transmitted via the packet multiplex network. The number of frequency division stages in the variable frequency divider 76A and the bit width of the master and slave phase data are determined from the difference between the transmission and reception clocks, the master phase transmission intervals, and the allowable error between the master and slave phases.

Figure 15:
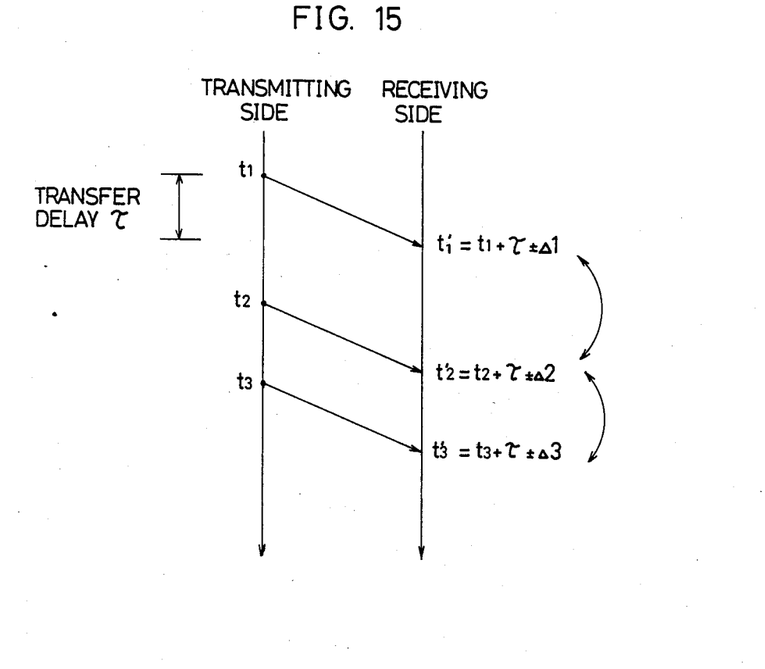
FIG. 15 shows the conditions to be met by a synchronization unit according to the invention.

The synchronization system according to the invention will now be described with reference to FIGS. 15 through 18. In FIG. 15, with this synchronization system, the present time $t_n$ may be measured under the control of the transmitter or master clock and transmitted as phase data to the receiver to correct a leading or lagging error $\pm \Delta_n$ of the receiver or slave clock $t'_n$, whereby the slave clock is synchronized to the master clock. In this case, the transmission delay or time $\tau$ must be constant whereas the transmission intervals $t_{n+1} - t_n$ need not be constant. The maximum transmission interval is determined by the extent of an error between the transmission and reception clocks.

Figure 16:
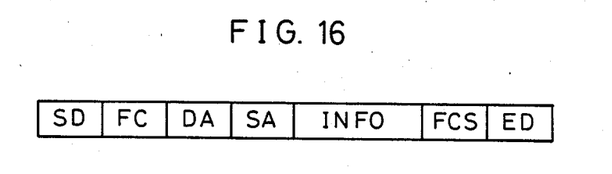
FIG. 16 shows a frame configuration according to the invention.

As is apparent from the frame configuration shown in FIG. 16, when the frame category FC is a time frame, the data INFO represents the phase data of a master clock. In this embodiment, the phase data has a fixed 4-bit length so that the frame consitutes a packet of a fixed length. Hence, the transmission time $\tau$ is constant. In addition, in a packet multiplex network such as a token ring or bus network, the upper limit of a transmission waiting time at each node is determined by the excursion time of a token. This condition may be met by making the components of the basic clock generator 6 and the clock reproduction circuit 7 sufficiently precise to allow a certain error between the transmission and reception locks even when the transmission waiting time is at the maximum level. In this way, the slave clock is synchronized to the master clock on the receiving end by receiving the transmitter present time data to correct the slave clock so that the error $\Delta_n$ or $t_{n+1} - t_n = t'_{n+1} - t'_n$ is constant.

Figure 17:
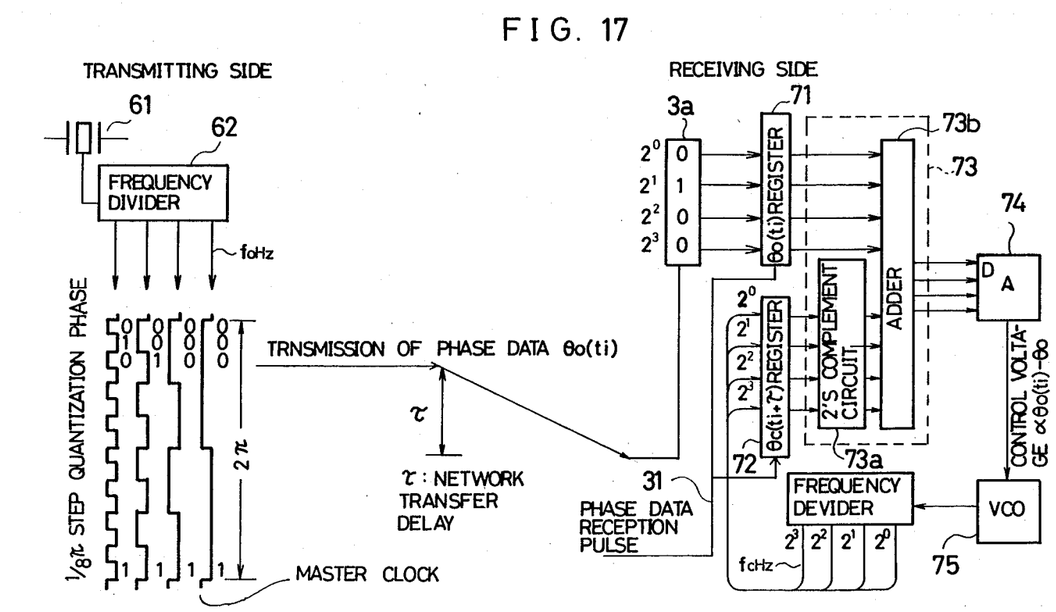
FIG. 17 shows the operation of the synchronization unit when the basic clock reproduction device of FIG. 9 is used.

The operation of the synchronization system will now be described in detail with reference to FIG. 17. The oscillation frequency of an oscillator 61 is divided by a frequency divider 62 in the transmitter to produce a master clock having a frequency of $f_0$ Hz and a phase $\theta_0$ obtained by quantization in $\pi/8$ steps. The phase data $\theta_0$ at a time $t_i$ is sampled and transmitted to the network as the time data ti of a frame such as shown in FIG. 16. This phase data $\theta_0$ ($t_i$) reaches the receiving end after the network transmission time $\pi\pi$ and is subjected to parallel-to-serial conversion in a receiving register 3a in the transmission/reception controller 3. At this point, a phase data reception pulse 31 is generated by the transmission/reception controller 3 based on the frame category FC of the received frame. Consequently, the phase data $\theta_0(t_i)$ is held in a master register 71 while the phase data $\theta_c$ ($t_i + \tau$) of a $f_c$-Hz slave clock at a time ($t_i + \tau$) is sampled and held in a slave phase register 72. The respective phase data $\theta_0(t_i)$ and $\theta_c(t_i + \tau)$ in the registers 71 and 72, respectively, are then applied to a subtractor 73, which consists of a complement circuit 73a and an adder 73b, to provide a phase difference between these two pieces of data. This digital phase difference is converted into analog data in a D/A converter 74. This analog data proportional to the phase difference $\theta_0$ ($t_i$) $-\theta_c$(ti$+\tau$) is applied to a voltage-controlled oscillator 75 as a control voltage. The oscillation frequency of the VCO 75 is controlled so as to keep the phase difference constant, and the output of the VCO 75 is applied to a frequency divider 76. The frequency divider 76 divides the oscillation frequency to generate a slave clock synchronized to the master clock and its phase data $\theta_c$ for timing the reception of the next phase data reception pulse 31.

According to the sampling theory, the conditions required for the above synchronization are that the network transmission time $\tau$ is constant and that the minimum sampling frequency $1/(t_{n+1} - t_n)$max, wherein $(t_{n+1} - t_n)$ is the transmission interval, is at least twice as large as the maximum difference between the master clock frequency $f_0$ and the slave clock frequency $f_c$. Since the transmission time $\tau$ is constant as described above, by making the phase difference variation small for the sampling cycle period, the slave phase may be locked to the master phase. Hence, it is possible to establish synchronization between two geographically remote nodes in the network by transmitting the master phase data through the network.

Figure 18:
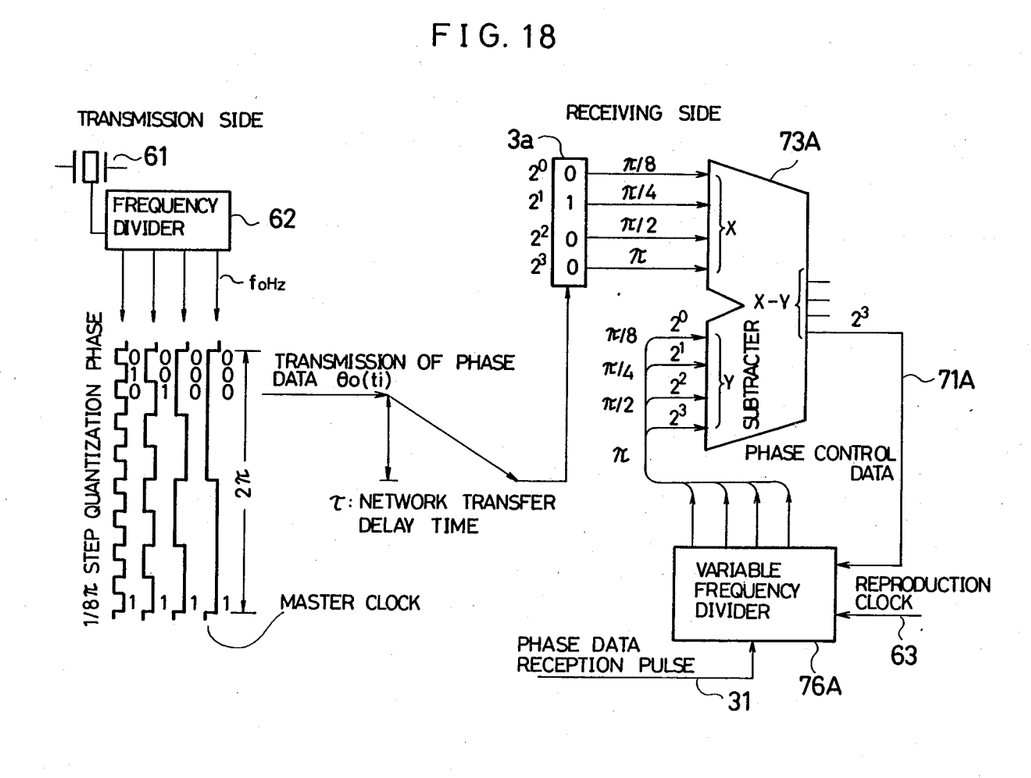
FIG. 18 shows the operation of the synchronization unit when the basic clock reproduction device of FIG. 10 is used.

FIG. 18 shows the synchronization system employing the circuit of FIG. 10 as a basic clock generation device. The phase data $\theta_0$ of a frame reaches the receiving end after the network transmission time $\tau$ and undergoes serial-to-parallel conversion in the receiving register 3a in the transmission/reception controller 3. At this point, a phase data reception pulse 31 is generated by the T/R controller 3 based on the frame category FC of the received frame. The phase control data 71A obtained from a subtractor 73A is applied to a variable frequency divider 76A for variable frequency division control as described above. Thus, the slave phase is synchronized to the master phase.

If clock synchronization between a number of nodes is established, a circuit switching method may be used in a packet multiplex network. According to the invention, the address data DA of a frame such as shown in FIG. 11 may be used to implement the following three different synchronization systems.

(1) When the DA is used as broadcast address data, the entire system may be synchronized to a single master clock.

(2) When the DA is used as multicast address data, synchronization may be established in each group having a master clock.

(3) When the DA is used as individual address data, synchronization may be established for each pair of mating nodes.

In other words, it is possible to provide a token ring network with a circuit switching function at a given communication speed or rate without using any particular controller for controlling the entire network (case 1). Abso, it is possible to from a network wherein different synchronization systems are present, which has been impossible before (cases 2 and 3). In these cases, circuit switching at a given communication rate may be implemented between the mating nodes independently of both the synchronization of the network as a whole and the communication rate of the network.

Although the oscillator 61 is provided in the basic clock generator 6 in the above embodiments, it is possible to use a clock supplied form the outside as an output of the oscillator 61 for establishing synchronization between nodes under the control of the external clock. In addition, the node 104 includes both the basic clock generator 6 and the clock reproduction circuit 7, but it is possible to use only one of them depending upon the node.

With the synchronization system according to the invention, it is possible to establish synchronization for implementing a circuit switching method in a packet multiplex network, such as a token ring or bus network, independently of both the synchronization of the network as a whole and the communication rate of the network.

While a preferred embodiment of the invention has been described using specific terms, such description is for illustrative purposes only, and it is to be understood that changes and variations may be made without departing from spirit and scope of the following claims.

What is claimed is:

1. A data transmission control system for use in a node which connects a terminal to a ring transmission line in a packet multiplex network of a token ring system, said data transmission control system comprising:
   a transmitter/receiver data buffer for temporarily storing data transmitted to or from said ring transmission line;
   basic clock generating means for generating a basic clock and its phase data to be transmitted in a packet to a next node to synchronize a basic clock of said next node; and
   a controller for controlling data storage of said data buffer and timing of data transmission to said ring transmission line so as to produce a predetermined period of time with which said transmitter/receiver data buffer transmits data to said ring transmission line or said terminal after it received said data.

2. The data transmission control system of claim 1, wherein said basic clock generating means comprises a basic clock generator and a basic clock reproduction circuit.

3. The data transmission control system of claim 2, wherein said basic clock generator comprises:
   an oscillator; and
   a frequency divider for dividing an oscillation frequency of said oscillator to provide a basic clock and digital value of individual frequency division stages to form phase data of said basic clock.

4. The data transmission control system of claim 2, wherein said basic clock generator comprises:
   a frequency divider for dividing a frequency of an externally supplied clock to generate a basic clock to be applied to said terminal while providing digital values of individual frequency division stages to form phase data of said basic clock.

5. The data transmission control system of claim 2, wherein said basic clock reproduction circuit comprises:
   a master phase register for holding digital phase data received from said ring transmission line;
   a voltage controlled oscillator with its oscillation frequency controlled by an applied control voltage;
   a frequency divider for dividing a frequency of said voltage controlled oscillator to generate a slave clock to be applied to said terminal while providing digital values of individual frequency division stages to generate digital phase data of said slave clock;
   a slave phase register for holding said digital phase data received from said frequency divider;
   a subtractor for subtracting an output of said slave phase register from an output of said master phase register to provide a digital phase difference; and
   a digital-to-analog converter for converting said digital phase difference into an analog voltage to be applied to said voltage controlled oscillator as a control voltage.

6. The data transmission control system of claim 2, wherein said basic clock reproduction circuit comprises:
   a variable frequency divider with a variable clock division ratio; and
   means for controlling said variable clock division ratio by comparing master phase received from said ring transmission line with slave phase generated by said variable frequeny divider so as to cause said slave phase to follow said master phase.

7. A token ring system packet multiplex network including a ring transmission line, and first and second nodes connected to said ring transmission line and functioning as a synchronization master and a synchronization slave, respectively, when synchronization is established between said first and second nodes,
   said first node comprises a basic clock generator for supplying a basic clock and its phase data represented in a predetermined number of bits, said phase data being sent out in a packet to said ring transmission line, and
   said second node comprises a basic clock reproduction circuit operable with said phase data received from said ring transmission line so as to reproduce a clock synchronized with said basic clock, said reproduced clock being used to establish synchronization between said first and second nodes.

8. The token ring system packet multiplex network of claim 7, wherein said first and second nodes each comprises both said basic clock generator and said basic clock reproduction circuit.

9. The data transmission control system of claim 1, wherein said predetermined period of time is set twice as long as a maximum token excursion time through said ring transmission line.

* * * * *